(12) United States Patent
Cyr et al.

(10) Patent No.: US 7,133,829 B2
(45) Date of Patent: Nov. 7, 2006

(54) DYNAMIC INSERTION OF A SPEECH RECOGNITION ENGINE WITHIN A DISTRIBUTED SPEECH RECOGNITION SYSTEM

(75) Inventors: James Cyr, Clinton, CT (US); Channell Green, Bpt, CT (US); Martin Hold, Fairfield, CT (US); Regina Kuhnen, Trumbell, CT (US); Andrew MacGinite, Roxbury, CT (US)

(73) Assignee: Dictaphone Corporation, Stratford, CT (US)

( * ) Notice: Subject to any disclaimer, the term of this patent is extended or adjusted under 35 U.S.C. 154(b) by 394 days.

(21) Appl. No.: 09/984,873

(22) Filed: Oct. 31, 2001

(65) Prior Publication Data

US 2003/0083879 A1 May 1, 2003

(51) Int. Cl.
*G10L 11/00* (2006.01)
*G06F 15/16* (2006.01)
*G06F 9/445* (2006.01)

(52) U.S. Cl. .................... 704/270.1; 709/201; 717/174
(58) Field of Classification Search ............. 704/270.1, 704/270, 231, 227–229; 709/227–229, 201–203; 713/1–2; 719/330
See application file for complete search history.

(56) References Cited

U.S. PATENT DOCUMENTS

| 5,036,539 | A | * | 7/1991 | Wrench et al. ............. 704/246 |
|---|---|---|---|---|
| 5,179,627 | A | | 1/1993 | Sweet et al. .................... 395/2 |
| 5,333,275 | A | | 7/1994 | Wheatley et al. .......... 395/2.52 |
| 5,513,298 | A | | 4/1996 | Stanford et al. |
| 5,615,296 | A | * | 3/1997 | Stanford et al. ......... 704/270.1 |
| 5,649,060 | A | | 7/1997 | Ellozy et al. .............. 395/2.87 |
| 5,664,195 | A | * | 9/1997 | Chatterji ..................... 717/178 |
| 5,727,950 | A | | 3/1998 | Cook et al. |
| 5,772,585 | A | | 6/1998 | Lavin et al. ................. 600/300 |
| 5,787,230 | A | | 7/1998 | Lee ........................... 395/2.44 |
| 5,799,273 | A | | 8/1998 | Mitchell et al. |
| 5,819,220 | A | | 10/1998 | Sarukkai et al. |
| 5,832,191 | A | | 11/1998 | Thorne |
| 5,848,390 | A | | 12/1998 | Matsumoto ................. 704/260 |
| 5,884,262 | A | | 3/1999 | Wise et al. |
| 5,893,134 | A | | 4/1999 | O'Donoghue et al. ...... 707/536 |
| 6,058,104 | A | | 5/2000 | Snelling et al. |
| 6,058,426 | A | * | 5/2000 | Godwin et al. ............. 709/229 |
| 6,064,957 | A | | 5/2000 | Brandow et al. ........... 704/235 |
| 6,076,059 | A | | 6/2000 | Glickman et al. .......... 704/260 |

(Continued)

FOREIGN PATENT DOCUMENTS

EP          1001337 A2      5/2000

(Continued)

OTHER PUBLICATIONS

A.S. Tanenbaum, "Distributed operating systems anno 1992. What have we learned so far?", 1993, Distributed Systems Engineering 1, p. 3-10.*

(Continued)

*Primary Examiner*—David Hudspeth
*Assistant Examiner*—Brian Albertalli
(74) *Attorney, Agent, or Firm*—Kelley Drye & Warren LLP

(57) ABSTRACT

A distributed speech recognition system provides for the convenient and expedited insertion of a new speech recognition engine. The system includes a central speech processor linked to at least one speech recognition engine. The at least one speech recognition engine includes means for addressing the central speech processor upon installation within the system. The means for addressing transmits to the central speech processor a message indicating its operating protocol and location to permit the central speech processor to identify and begin transmitting work thereto.

16 Claims, 3 Drawing Sheets

U.S. PATENT DOCUMENTS

| | | |
|---|---|---|
| 6,081,780 A | 6/2000 | Lumelsky |
| 6,094,635 A | 7/2000 | Scholz et al. |
| 6,101,467 A | 8/2000 | Bartosik |
| 6,122,613 A | 9/2000 | Baker .......................... 704/235 |
| 6,122,614 A | 9/2000 | Kahn et al. ................. 704/235 |
| 6,125,284 A | 9/2000 | Moore et al. |
| 6,163,794 A | 12/2000 | Lange et al. |
| 6,173,259 B1 | 1/2001 | Bijl et al. |
| 6,192,339 B1 * | 2/2001 | Cox .......................... 704/270 |
| 6,195,641 B1 | 2/2001 | Loring et al. ............... 704/275 |
| 6,208,964 B1 | 3/2001 | Sabourin .................... 704/244 |
| 6,260,011 B1 | 7/2001 | Heckerman et al. ........ 704/235 |
| 6,263,308 B1 | 7/2001 | Heckerman et al. ........ 704/231 |
| 6,269,188 B1 | 7/2001 | Jamali ......................... 382/229 |
| 6,282,652 B1 | 8/2001 | Scheifler |
| 6,298,326 B1 | 10/2001 | Feller ......................... 704/270 |
| 6,308,158 B1 | 10/2001 | Kuhnen et al. ............. 704/275 |
| 6,311,242 B1 * | 10/2001 | Falkenburg et al. ........ 710/301 |
| 6,327,568 B1 * | 12/2001 | Joost ....................... 704/270.1 |
| 6,338,038 B1 | 1/2002 | Hanson ...................... 704/500 |
| 6,366,882 B1 | 4/2002 | Bijl et al. ................... 704/235 |
| 6,434,526 B1 * | 8/2002 | Cilurzo et al. ........... 704/270.1 |
| 6,513,010 B1 | 1/2003 | Lewin et al. |
| 6,526,380 B1 * | 2/2003 | Thelen et al. ............... 704/251 |
| 6,535,849 B1 | 3/2003 | Pakhomov et al. |
| 6,654,793 B1 * | 11/2003 | Wollrath et al. ............ 709/217 |
| 6,757,655 B1 * | 6/2004 | Besling et al. ........... 704/270.1 |
| 6,760,697 B1 | 7/2004 | Neumeyer et al. |
| 6,766,294 B1 | 7/2004 | MacGintie et al. |
| 6,785,654 B1 | 8/2004 | Cyr et al. |
| 2001/0020226 A1 | 9/2001 | Minamino et al. .......... 704/251 |
| 2001/0029452 A1 | 10/2001 | Chen ........................... 704/251 |
| 2001/0032083 A1 | 10/2001 | Van Cleven |
| 2002/0055845 A1 | 5/2002 | Ueda et al. |
| 2002/0091527 A1 | 7/2002 | Shiau |
| 2002/0138276 A1 | 9/2002 | Damiba |
| 2002/0194000 A1 | 12/2002 | Bennett et al. |
| 2003/0083883 A1 | 5/2003 | Cyr et al. |
| 2004/0049385 A1 | 3/2004 | Lovance et al. |
| 2004/0088162 A1 | 5/2004 | He et al. |
| 2005/0096911 A1 * | 5/2005 | Schmid et al. ........... 704/270.1 |

FOREIGN PATENT DOCUMENTS

| | | |
|---|---|---|
| EP | 1001337 A3 | 6/2002 |
| GB | 2323693 | 9/1998 |
| JP | 2000172483 | 6/2000 |
| JP | 20022091477 | 3/2002 |
| WO | WO 00/54252 | 9/2000 |

OTHER PUBLICATIONS

Srinivasan, "Binding Protocols for ONC RPC Version 2", RFC 1833, Aug. 1995, Available at: www.faqs.org/rfcs/rfc1833.html.*

Srinivasan, "Remote Procedure Call Protocol Version 2", RFC 1831, Aug. 1995, Available at: www.faqs.org/rfcs/rfc1831.html.*

Clercq, "RPC Dynamic Port Allocation", Aug. 21, 2001, Available at: www.winnetmag.com/Article/ArticleID/22206/22206.html.*

The Open Group, "DCE 1.1: Remote Procedure Call—Introduction to the RPC API", Catalog No. C706, Aug. 1997, Available at: http://www.opengroup.org/products/publications/catalog/c706.htm.*

Elmasri/Navathe, Fundamentals of Database Systems, pp. 76-79.

Hundt. et al., Speech Processing in Radiology, pp. 1451-1456.

F. Jelinek, Self-Organized Language Modeling for Speech Recognition, pp. 450-505.

Leggetter/Woodland, Maximum Likelihood Linear Regression for Speaker Adaptation of Continuous Density Hidden Markov Models, pp. 171-185.

Neumeyer, et al., A Comparative Study of Speaker Adaptation Techniques, pp. 1127-1130.

Shinoda, et al., Unsupervised Adaptation Using Structural Bayes Approach, pp. 793-796.

Zick, et al., Voice Recognition Software Versus a Traditional Transcription Service for Physician Charting in the ED, pp. 295-298.

Liskov, "Primitives for Distributed Computing", *Laboratory for Computer Science, MIT*, pp. 33-42, 1979.

Astley et al., "Customizeable Middleware for Modular Distributed Software",*Communication of the ACM*, vol. 44, No. 5, pp. 99-107, May 2001.

* cited by examiner

DYNAMIC INSERTION OF A SPEECH RECOGNITION ENGINE WITHIN A DISTRIBUTED SPEECH RECOGNITION SYSTEM

BACKGROUND OF THE INVENTION

1. Field of the Invention

The invention relates to a distributed speech recognition system. More particularly, the invention relates to a distributed speech recognition system utilizing dynamic remote procedure call to connect speech recognition engine wrappers to a central speech processor.

2. Description of the Prior Art

Recent developments in speech recognition and telecommunication technology have made distributed, automated speech recognition systems for transcription applications a reality. The ability to provide automated transcription is not only limited to speech recognition products utilized on a single PC. Large, distributed systems for automated transcription are currently available.

These distributed speech recognition systems allow subscribers to record speech files at a variety of locations, transmit the recorded speech files to a central processing facility where the speech files are transcribed through the application of speech recognition technology and receive fully transcribed text files of the originally submitted speech files. As those skilled in the art will certainly appreciate, such systems require substantial automation to ensure that all speech files are handled in an orderly and efficient manner.

Prior systems have relied upon a central processing facility linked to clusters of speech recognition engines governed by a speech recognition interface. In accordance with such systems, speech files enter the central processing facility and are simply distributed amongst the plurality of speech recognition clusters with no regard for the efficiency of the cluster to which the file is assigned or the ability of specific speech recognition engines to handle certain speech files.

With the many speech recognition engines linked to the central processing facility it often becomes necessary to add or remove speech recognition engines to the overall system. However, when such speech recognition engines are added, it is necessary that the central processor registry be updated with the location, protocol and availability of the newly added specific speech recognition engine. As current systems rely upon the central processor registry to ensure that interaction between the central processor and the speech recognition engine is possible, updating of the central processor registry may only be completed upon the initialization, or boot-up, of the central speech processor. Specifically, the central speech processor must be powered down, the new speech recognition engine installed, and the central speech processor powered back up to complete the reconfiguration of the operating system, and, consequently, the central processor registry. As such, it is necessary that the entire system be momentarily shut down when one wishes to add a new speech recognition engine to the distributed speech recognition system.

With the foregoing in mind, a need currently exists for a distributed transcription system wherein speech recognition engines are dynamically added without requiring the disruption associated with shutting down the entire system so that the central processor may reinitialize. The present system provides such a transcription system.

SUMMARY OF THE INVENTION

It is, therefore, an object of the present invention to provide a distributed speech recognition system providing for the convenient and expedited insertion of a new speech recognition engine. The system includes a central speech processor linked to at least one speech recognition engine. The at least one speech recognition engine includes means for addressing the central speech processor upon installation within the system. The means for addressing transmits to the central speech processor a message indicating its operating protocol and location to permit the central speech processor to identify and begin transmitting work thereto.

It is also an object of the present invention to provide a distributed speech recognition system wherein the speech recognition engine includes a speech recognition engine wrapper.

It is another object of the present invention to provide a distributed speech recognition system wherein the speech recognition engine communicates with the central speech processor using remote procedure call.

It is a further object of the present invention to provide a distributed speech recognition system wherein the speech recognition engine wrapper functions as an interface between the central speech processor and the speech recognition engine.

It is yet a further object of the present invention to provide a distributed speech recognition system wherein the speech recognition engine communicates with the central speech processor using remote procedure call.

It is still another object of the present invention to provide a distributed speech recognition system including a plurality of speech recognition engines.

It is also an object of the present invention to provide a method for the convenient and expedited insertion of a new speech recognition engine within a distributed speech recognition system The method is achieved by lining a central speech processor to a speech recognition engine, the at least one speech recognition engine addressing the central speech processor upon installation within the system with a message indicating its operating protocol and location to permit the central speech processor to identify and begin transmitting work thereto.

Other objects and advantages of the present invention will become apparent from the following detailed description when viewed in conjunction with the accompanying drawings, which set forth certain embodiments of the invention.

DESCRIPTION OF THE PREFERRED EMBODIMENT

The detailed embodiment of the present invention is disclosed herein. It should be understood, however, that the disclosed embodiment is merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
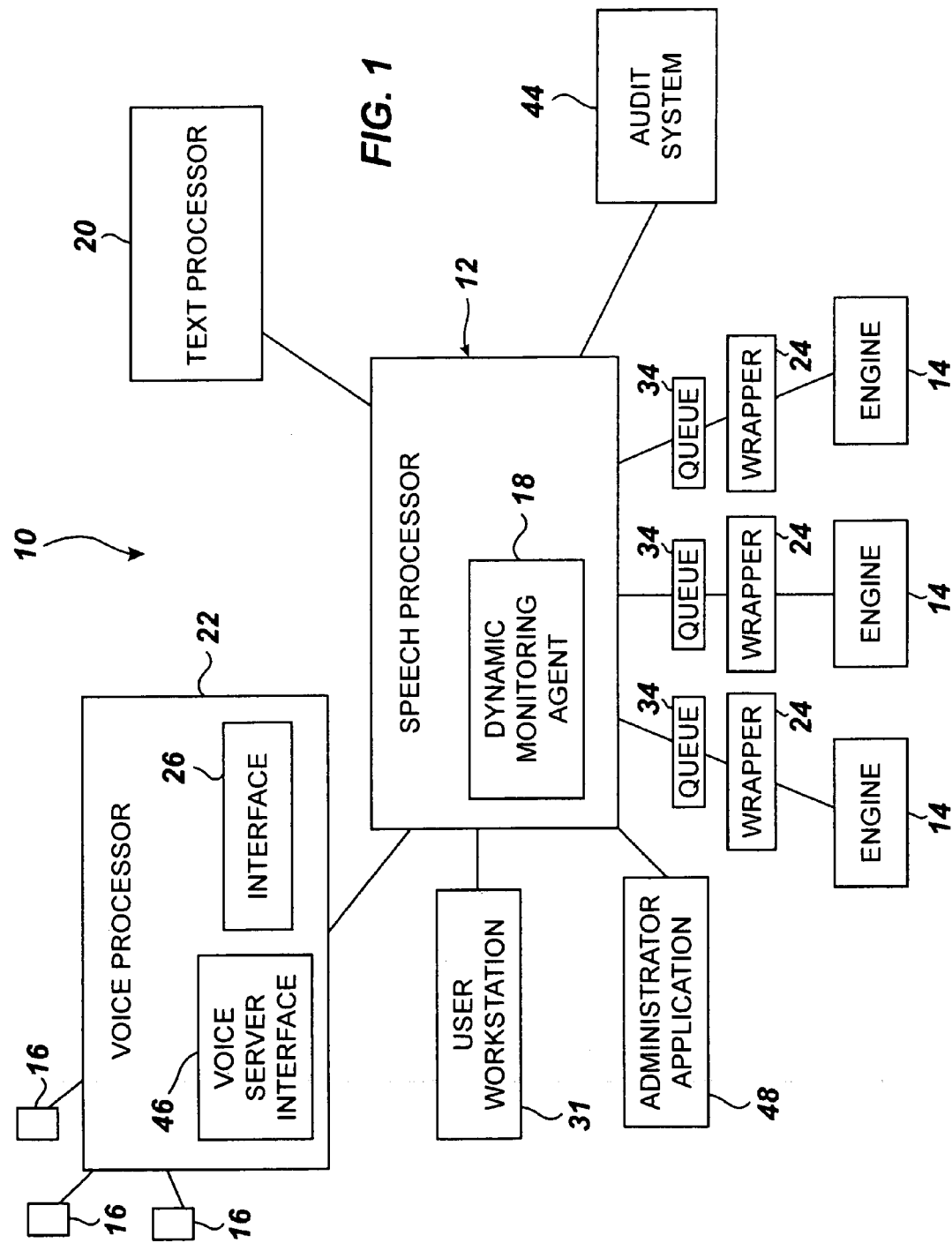
FIG. 1 is a schematic of the present system.
Figure 2:
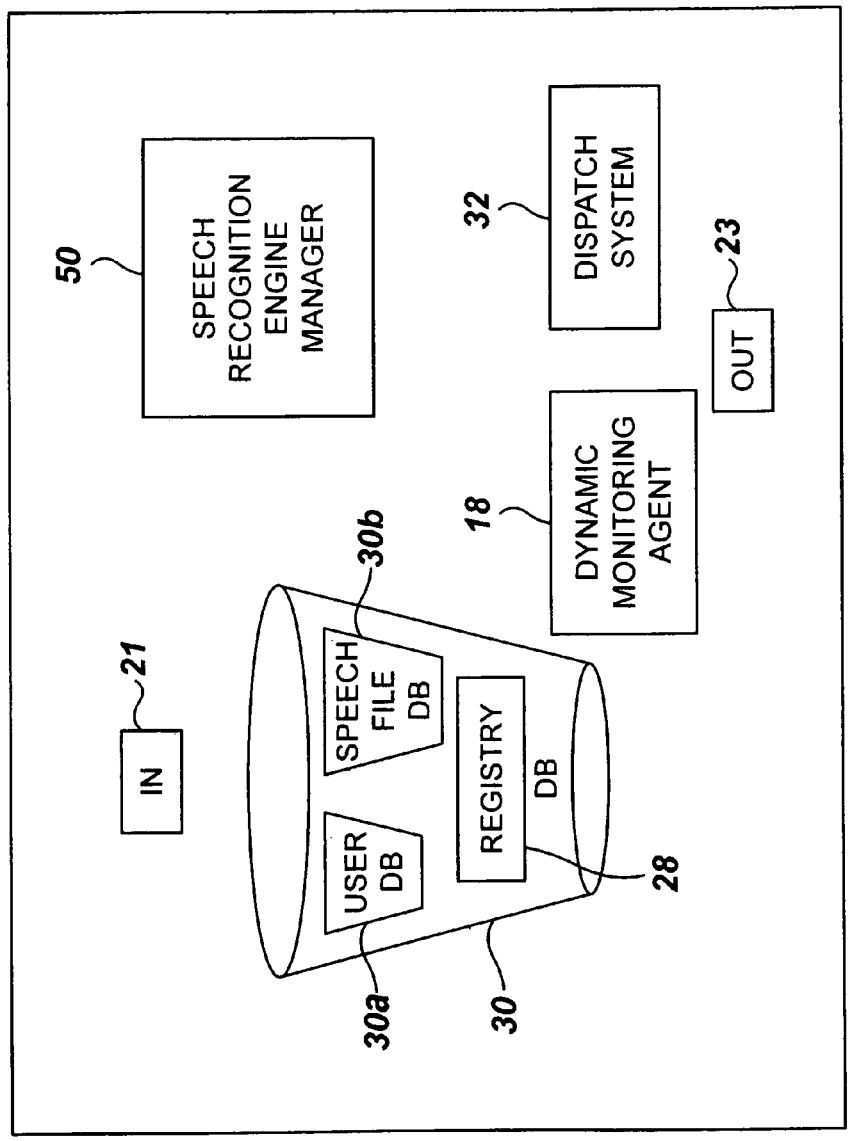
FIG. 2 is a schematic of the central speech processor in accordance with the present invention.
Figure 3:
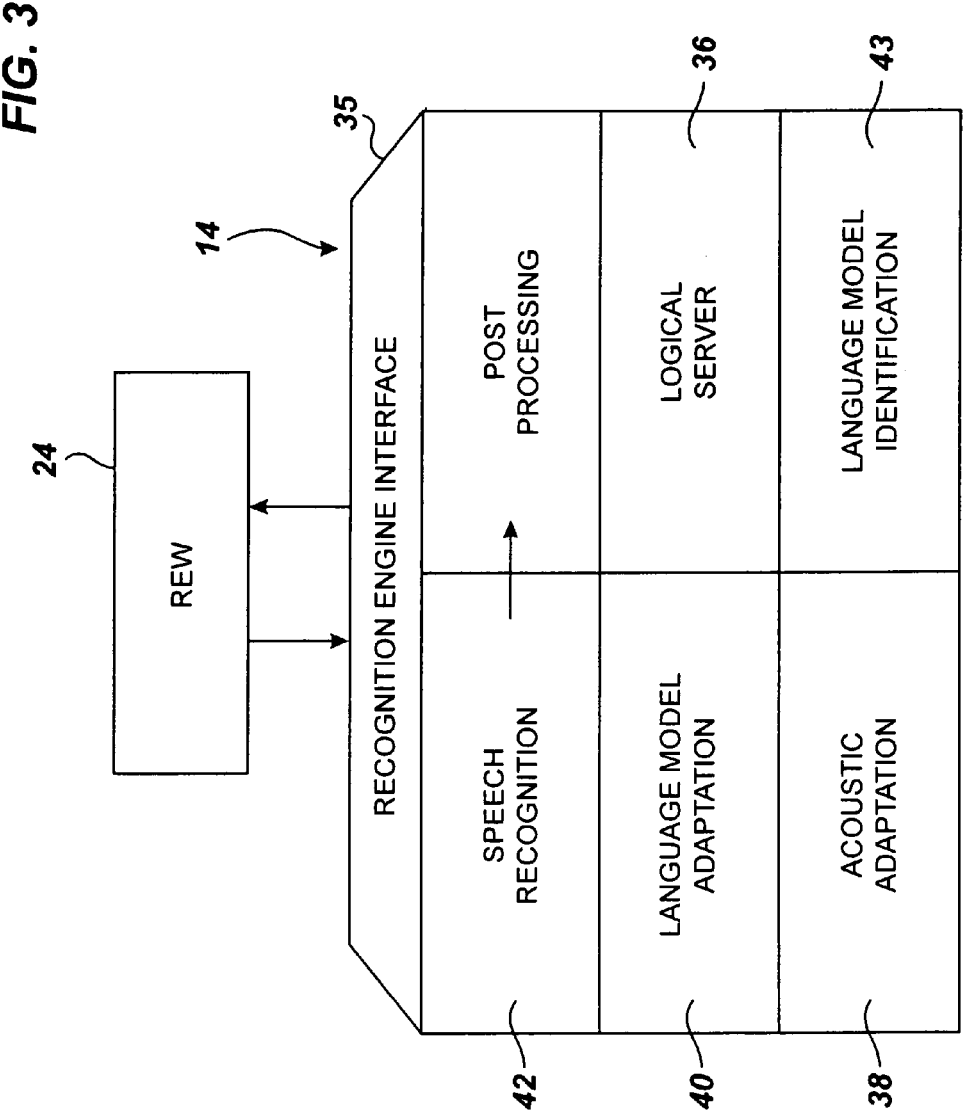
FIG. 3 is a schematic of the speech recognition engine wrapper and speech recognition engine in accordance with the present invention.

With reference to FIGS. 1, 2 and 3, a system 10 is disclosed for the convenient and expedited insertion of a new speech recognition engine 14 within a distributed speech recognition system 10. As will be discussed below in greater detail, dynamic addition of new speech recognition engines 14 is achieved by providing each of the speech recognition engines 14 with the ability to address the central speech processor 12 upon installation within the system 10 and instruct the central speech processor 12 as to the location and availability of the newly added speech recognition engine 14.

In accordance with a preferred embodiment of the present invention, the distributed speech recognition system 10 generally includes a central speech processor 12 linked to a plurality of speech recognition engines 14 and user interfaces 16, for example, a plurality of workstations. The construction and design of the system provide for redundant use of a plurality of speech recognition engines 14 directly linked with the central speech processor 12, thus permitting expanded use of available resources in a manner which substantially improves the efficiency of the distributed speech recognition system 10.

As those skilled in the art will certainly appreciate, the distributed speech recognition system 10 generally includes a variety of functional components, such as, for example, a central speech processor 12, user interfaces 16, a voice processor 22, a text processor 20, a speech recognition engine 14, a speech recognition engine wrapper 24, an administrator application 48, an audit system 44, a voice recognition logical server 36, a language model adaptation server 40, acoustic adaptation server 38, a language model identification server 43 and speech recognition administration server 42, although not all of these components are directly relevant to the present invention and will not be discussed in detail herein. Further details of a general system which may be employed in accordance with the present invention are disclosed in commonly owned U.S. patent application Ser. No. 09/984,874, entitled "DISTRIBUTED SPEECH RECOGNITION SYSTEM", filed concurrently herewith and incorporated herein by reference.

With reference to the architecture of the present system 10, and as mentioned above, the system generally includes a central speech processor 12 linked to, and controlling interaction with, a plurality of distinct speech recognition engines 14. The central speech processor 12 is adapted for receiving and transmitting speech files, and accordingly includes an input 21 for receiving speech files from system users and an output 23 for transmitting the speech files (with appropriate appended information) to the variety of speech recognition engines 14 linked to the central speech processor 12. Inputs and outputs such as these are well known in the art, and those skilled in the art will certainly appreciate the many possible variations in constructing appropriate input and outputs for use in accordance with the present invention. In accordance with a preferred embodiment of the present invention, the speech files are WAV files input to the speech recognition engines in a manner known to those skilled in the art.

The central speech processor 12 is responsible for the system in total and is the main hub of the system. It is designed to allow maximum flexibility. With this in mind, the central speech processor 12 handles all messaging to and from workstation clients, database maintenance, system monitoring, auditing, and corrected text submission for the speech recognition engine 14. The corrected text submitted for speech recognition engines 14 is initially provided by the text processor 20 which submits converted text files for comparison with the prior speech files. When such a text file is submitted for text correction, the central speech processor 12 verifies that the text file has an associated speech file which was previously subjected to speech recognition. If no such speech file is located, the text file is deleted and is not considered. If, however, the text file resulted from the application of the speech recognition engine 14, the corrected text file is forward to and evaluated by the speech recognition engine 14 to enhance future transcriptions.

All workstations are required to log onto the central speech processor 12 in one way or another. By way of the present invention, however, speech recognition engines 14 may be added without the need for reinitialization of the central speech processor 12. The central speech processor 12 is the only component communicating with all external applications, including, but not limited to the voice processor 22, text processor 20, the speech recognition engines 14, and their associated speech recognition engine wrappers 24. The voice processor 22 has been specifically designed with an interface 26 adapted for use in conjunction with the speech recognition engines 14. The interface 26 is adapted to place speech files into a specific state, for example, where a speech file has been reviewed an transcribed, the interface will properly note that state of such a speech file. As will be discussed below in greater detail, the voice processor 22 includes both server and client functionality, while the text processor 20 includes only server functionality.

All fixed system configurations are set in the registry 28 of the central speech processor 12. All runtime system configurations and user configuration settings are stored in the database 30 of the central speech processor 12. The central speech processor 12 looks at the registry 28 settings only at startup so all information that is subject to change must be stored in the registry 28. As discussed above, prior systems similar to that used in accordance with the present invention stored information concerning the protocol and the location of the various speech recognition engines 14 linked to the central speech processor 12 in the central speech processor registry 28. As such, when prior systems required the addition or removal of a speech recognition engine, the central speech processor was shut down, the speech recognition engine was added, and the speech processor was restarted, booted-up and reinitialized so as to update the registry with the then current speech recognition engine information.

The present invention is generally directed to the relationship between the speech recognition engines 14 and the central speech processor 12, and the removal of the central speech processor registry as a mechanism for maintaining contact with the various speech recognition engines linked thereto. In general, the speech recognition engine 14 and the central speech processor 12 function in a client/server relationship. Client/server describes the relationship between two computer programs in which one program, the client, makes a service request from another program, the server, which fulfills the request. Although the client/server idea can be used by programs within a single computer, it is a more important concept for application in a network. In a network the client/server model provides a convenient way to interconnect programs that are distributed efficiently across different locations. Computer transactions using the client/server model are very common. For example, to check your bank account from your computer, a client program in your computer forwards your request to a server program at the bank. That program may in turn forward the request to its own client program that sends a request to a database server at another bank computer to retrieve your account balance. The balance is returned back to the bank data client, which in turn serves it back to the client in your personal computer, which displays the information for you.

The client/server model has become one of the central ideas of network computing. Most business applications being written today use the client/server model. So does the Internet's main program, TCP/IP. In the usual client/server model, one server, sometimes called a daemon, is activated and awaits client requests. Typically, multiple client programs share the services of a common server program Both client programs and server programs are often part of a larger program or application. Relative to the Internet, your Web browser is a client program that requests services (the sending of Web pages or files) from a Web server (which technically is called a Hypertext Transport Protocol or HTTP server) in another computer somewhere on the Internet. Similarly, your computer with TCP/IP installed allows you to make client requests for files from File Transfer Protocol (FTP) servers in other computers on the Internet.

The speech recognition engines 14 coupled to the central speech processor 12 in accordance with the present invention may take a variety of forms and it is not necessary that any specific combination of speech recognition engines be utilized. Specifically, it is contemplated that engines 14 from different manufacturers may be used in combination, for example, those from Phillips may be combined with those of Dragon Systems and IBM. However, in accordance with a preferred embodiment of the present invention the Dragon Systems' speech recognition engine 14 is contemplated for use. Similarly, the plurality of speech recognition engines 14 may be loaded with differing language models. For example, where the system 10 is intended for use in conjunction with the medical industry, it well known that physicians of different disciplines utilize different terminology in their day to day dictation of various matters. With this in mind, the plurality of speech recognition engines 14 maybe loaded with language models representing the wide variety of medical disciplines, including, but not limited to, radiology, pathology, disability evaluation, orthopedics, emergency medicine, general surgery, neurology, ears, nose & throat, internal medicine and cardiology.

In accordance with a preferred embodiment of the present invention, and as described throughout the body of the present specification, each speech recognition engine 14 includes an associated speech recognition engine wrapper 24. The speech recognition engine wrapper 24 is positioned within the system 10 between the specific processor for the speech recognition engine 14 and the central speech processor 12. The speech recognition engine wrapper 24 is intended to isolate the speech recognition engine 14 from the remainder of the present distribute speech recognition system 10.

In accordance with a preferred embodiment of the present invention, the speech recognition engine wrapper 24 resides on the same computer as the speech recognition engine itself and is primarily responsible for:

Receiving (user info, job)/path from the central speech processor and submit it to the speech recognition engine, as well as returning any recognized error or success for recognized text/path to the central speech processor.

Receiving corrected text information/path from the central speech processor.

Maintain communication with the central speech processor for status updates.

Submitting corrected text information/path for language model/acoustical adaptation.

Receiving user information from the central speech processor and copying user language files locally if applicable for acoustical/enrollment adaptation.

Handling errors from and to the central speech processor and the speech recognition engine.

Reporting errors and status information to the auditor.

More specifically, the speech recognition engine wrapper 24 provides a uniform interface for access to the various speech recognition engines 14 utilized in accordance with the present invention. The use of a single speech processor 12 as a direct interface to a plurality of speech recognition engines is further implemented by the inclusion of linked databases storing both the user data 30a and speech files 30b. In accordance with a preferred embodiment of the present invention, the database 30 is an SQL database although other database structures may be used without departing from the spirit of the present invention. The user data 30a is composed of data relating to registered users of the system. Such user data may include author, context, priority, and identification as to whether dictation is to be used for speech recognition or manual transcription. The user data 30a also includes an acoustic profile of the user.

The wrappers 24 utilized in accordance with the present invention, are designed so as to normalize the otherwise heterogeneous series of inputs and outputs utilized by the various speech recognition engines 14. The speech recognition engine wrappers 24 create a common interface for the speech recognition engines 14 and provide the speech recognition engines 14 with appropriate inputs. The speech processor 12, therefore, need not be programmed to interface with each and every type of speech recognition engine 14, but rather may operate with the normalized interface defined by the speech recognition engine wrapper 24.

The speech recognition engine wrapper 24 functions to isolate the speech recognition engine 12 from the remainder of the system 10. In this way, the speech recognition engine wrapper 24 directly interacts with the speech processor 12 and similarly interacts directly with its associated speech recognition engine 14. The speech recognition engine wrapper 24 will submit a maximum of 30 audio files to the speech recognition engine 14 directly and will monitor the speech recognition engine 14 for work that is finished with recognition. The speech recognition engine wrapper 24 will then retrieve the finished work and save it in an appropriate format for transmission to the speech processor.

The speech recognition engine wrapper 24 will also accept all work from the central speech processor 12, but only submits a maximum of 30 jobs to the associated speech recognition engine 14. Remaining jobs are kept in a queue 34 in order of priority. If a new job is accepted it is put at the end of the queue 34 for its priority. Work that has waited is bumped up based on a time waited for recognition. When corrected text is returned to the speech recognition engine wrapper 24, it is accepted for acoustical adaptation. The speech recognition engine wrapper 24 further functions to create a thread to monitor the speech recognition engine 14 for recognized work completed with a timer, create an error handler for reporting status back to the central speech processor 12 so work can be rerouted, and accept the corrected text and copy it to a speech recognition engine 14 assigned with acoustical adaptation function.

In accordance with the present invention, the speech recognition engines 14, and particularly, the speech recognition engine wrappers 24, generally include software for contacting the central speech processor 12 upon installation within the system 10. The software for contacting transmits the central speech processor 12 a message indicating its location and availability status in a manner permitting the central speech processor 12 to commence the transmission of work thereto.

More specifically, the speech recognition engine wrapper 24 communicates with the central speech processor 12 via remote procedure calls. A remote procedure call (RPC) is a protocol that one program can use to request a service from a program located in another computer in a network without having to understand network details. (A procedure call is also sometimes known as a function call or a subroutine call.) RPC uses the client/server model. The requesting program is a client and the service-providing program is the server. Like a regular or local procedure call, an RPC is a synchronous operation requiring the requesting program to be suspended until the results of the remote procedure are returned. However, the use of lightweight processes or threads that share the same address space allows multiple RPCs to be performed concurrently. When program statements that use RPC are compiled into an executable program, a stub is included in the compiled code that acts as the representative of the remote procedure code. When the program is run and the procedure call is issued, the stub receives the request and forwards it to a client runtime program in the local computer. The client runtime program has the knowledge of how to address the remote computer and server application and sends the message across the network that requests the remote procedure. Similarly, the server includes a runtime program and stub that interface with the remote procedure itself. Results are returned the same way.

In addition to those functionalities listed above relating to the interaction between the speech recognition engine wrapper 24 and the central speech processor 12, the speech recognition engine wrapper 24 addresses the central speech processor 12 upon the addition or removal of a speech recognition engine 14. Addressing of the central speech processor 12 in accordance with the present invention allows for the dynamic insertion or removal of a speech recognition engine 14 to or from the distributed speech recognition system without the need for rebooting the central speech processor 12 to ensure that the new or removed speech recognition engine 14 is properly noted in the registry of the central speech processor 12.

As those skilled in the art will certainly appreciate, and as briefly discussed above, a conventional registry is a single place for keeping such information as what hardware is attached, what system options have been selected, how computer memory is set up, and what application programs are to be present when the operating system is started. In general, the user updates the registry indirectly using Control Panel tools. When programs or hardware are installed or uninstalled application programs, the registry is also updated. In the present network environment, registry information is maintained on the central speech processor so that system policies for individuals and workgroups can be managed centrally. However, operation of the registry generally requires that the central speech processor be rebooted to ensure proper registry information for a new application or hardware is updated on the registry. This updating is achieved at reboot by addressing each previously noted application and/or hardware member to confirm that these desired components are in fact connected to the central speech processor.

In accordance with the present invention, such rebooting is not necessary to ensure that the central speech processor 12 "knows" a new component, for example, a speech recognition engine 14, has been added to the distributed speech recognition system 10. This step is obviated by providing each speech recognition engine wrapper 24, and consequently, each speech recognition engine 14, with the ability to immediately address the central speech processor 12 with relevant information upon the introduction of the speech recognition engine 14 to the system 10. As such, the central speech processor registry is no longer required to maintain location and protocol information for each speech recognition engine. The relevant information transmitted by the speech recognition engine wrapper 24 includes the protocol used by the speech recognition engine 14 and the name of the speech recognition engine 14 making contact with the central speech processor 12. The name of the speech recognition engine 14 may include the IP address, network name, or other designation by which the central speech processor 12 may address the speech recognition engine.

As such, and upon introduction of a new speech recognition engine 14 to the present distributed speech recognition system 10, the speech recognition engine wrapper 24 of the new speech recognition engine 14 addresses the central speech processor 12 with the protocol used by the speech recognition engine wrapper 24 and the name of the speech recognition engine 14 making contact with the central speech processor 12. This information informs the central speech processor 12 as to the presence of the new speech recognition engine 14 and its availability to function on behalf of the central speech processor 12. With this information the central speech processor 12 is able to locate and transmit requests to the new speech recognition engine 14 without the need for rebooting to fully prepare the central speech processor registry 28 for interaction with the new speech recognition engine 14.

While the preferred embodiments have been shown and described, it will be understood that there is no intent to limit the invention by such disclosure, but rather, is intended to cover all modifications and alternate constructions falling within the spirit and scope of the invention as defined in the appended claims.

The invention claimed is:

1. A distributed speech recognition system providing for the convenient and expedited insertion of a new speech recognition engine into said system without rebooting, comprising:

a central speech processor, said central speech processor comprising:

a first server component, said first server component configured to receive a call from a speech recognition engine wrapper, said call containing an address of said speech recognition engine wrapper;

a first client component, said first client component configured to transmit a call to said speech recognition engine wrapper, said call containing an address of said central speech processor; and a first address memory, said first address memory configured to store said address of said speech recognition engine wrapper;

said speech recognition engine wrapper associated with said central speech processor and with at least one speech recognition engine, said speech recognition engine wrapper comprising:

a second client component, said second client component configured to transmit said call to said central speech processor;

a second server component, said second server component configured to receive said call from said central speech processor;

a second address memory, said second address memory configured to store said address of said central speech processor; and at least one software application, said at least one software application corresponding with said at least one speech recognition engine;

said at least one speech recognition engine associated with said speech recognition engine wrapper, said at least one speech recognition engine containing at least one recognition grammar corresponding to a speech command;

said at least one software application of said speech recognition engine wrapper configured to communicate with said at least one speech recognition engine upon installation of said at least one speech recognition engine, said at least one software application further configured to alert said second client component of said installation;

said second client component configured to call said first server component, said second client component further configured to provide said first server component with said address of said speech recognition engine wrapper;

said first server component configured to receive said address of said speech recognition engine wrapper and store said address in said first address memory, said first server component further configured to alert said first client component of said stored address;

said first client component configured to call said second server component based on said address stored in said first address memory, said first client component further configured to provide said second server component with any changes with said address of said central speech processor;

said second server component configured to receive any changes with said address of said central speech processor and store said address in said second address memory, said second server component further configured to alert said second client component of said stored address;

said central speech processor configured to recognize said speech recognition engine based on said call by said second client component; and said central speech processor further configured to transmit work to said speech recognition engine.

2. The distributed speech recognition system according to claim 1, wherein the at least one speech recognition engine is configured to communicate with the central speech processor using remote procedure call.

3. The distributed speech recognition system according to claim 1, wherein the speech recognition engine wrapper is configured to function as an interface between the central speech processor and the at least one speech recognition engine.

4. The distributed speech recognition system to claim 3, wherein the at least one speech recognition engine is configured to communicate communicates with the central speech processor using remote procedure call.

5. The distributed speech recognition system according to claim 1, wherein the at least one speech recognition engine is configured to communicate with the central speech processor via remote procedure call.

6. The distributed speech recognition system according to claim 1, wherein a plurality of speech recognition engines are associated with said speech recognition engine wrapper.

7. The distributed speech recognition system according to claim 1, wherein the speech recognition engine wrapper has a first interface for communication with the at least one speech recognition engine and a second interface for communication with the central speech processor.

8. A method for the convenient and expedited insertion of a new speech recognition engine within a distributed speech recognition system without rebooting, comprising the following steps:

providing a central speech processor, said central speech processor comprising:

a first server component, said first server component configured to receive a call from a speech recognition engine wrapper, said call containing an address of said speech recognition engine wrapper;

a first client component, said first client component configured to transmit a call to said speech recognition engine wrapper, said call containing an address of said central speech processor; and a first address memory, said first address memory configured to store said address of said speech recognition engine wrapper;

associating said central speech processor with said speech recognition engine wrapper, said speech recognition engine wrapper comprising:

a second client component, said second client component configured to transmit said call to said central speech processor;

a second server component, said second server component configured to receive said call from said central speech processor;

a second address memory, said second address memory configured to store said address of said central speech processor; and at least one software application, said at least one software application corresponding with at least one speech recognition engine;

associating said speech recognition engine wrapper with said at least one speech recognition engine, said at least one speech recognition engine containing at least one recognition grammar corresponding to a speech command;

said at least one software application of said speech recognition engine wrapper communicating with said at least one speech recognition engine upon installation of said at least one speech recognition engine, said at least one software application alerting said second client component of said installation;

said second client component calling said first server component, said second client component providing said first server component with said address of said speech recognition engine wrapper;

said first server component receiving said address of said speech recognition engine wrapper and storing said address in said first address memory, said first server component alerting said first client component of said stored address;

said first client component calling said second server component based on said address stored in said first address memory, said first client component providing said second server component with any changes with said address of said central speech processor;

said second server component receiving any changes with said address of said central speech processor and storing said address in said second address memory, said second server component alerting said second client component of said stored address;

said central speech processor recogizing said speech recognition engine based on said call by said second client component; and said central speech processor transmitting work to said speech recognition engine.

9. The method according to claim 8, wherein the at least one speech recognition engine communicates with the central speech processor using remote procedure call.

10. The method according to claim 8, wherein the speech recognition engine wrapper functions as an interface between the central speech processor and the at least one speech recognition engine.

11. The method according to claim 10, wherein at least one speech recognition engine communicates with the central speech processor using remote procedure call.

12. The method according to claim 8, wherein the at least one speech recognition engine communicates with the central speech processor via remote procedure call.

13. The method according to claim 8, wherein the speech recognition engine wrapper has a first and a second interface such that the at least one speech recognition engine is configured to communicate with the speech recognition engine wrapper via the first interface, which is configured to communicate with the central speech processor via the second interface.

14. A distributed speech recognition system providing for the convenient and expedited insertion of a new speech recognition engine without rebooting, comprising:

a speech recognition engine wrapper having at least a first and a second interface, said speech recognition engine wrapper comprising:

a client component, said client component configured to transmit a call to a central speech processor, said call containing an address of said speech recognition engine wrapper;

a server component, said server component configured to receive a call from said central speech processor, said call containing an address of said central speech processor;

an address memory, said address memory configured to store said address of said central speech processor; and at least one software application, said at least one software application corresponding with said at least one speech recognition engine;

said central speech processor linked to said first interface, said central speech processor comprising:

a server component, said server component configured to receive said call from said speech recognition engine wrapper;

a client component, said client component configured to transmit said call to said speech recognition engine wrapper; and an address memory, said address memory configured to store said address of said speech recognition engine wrapper;

said at least one speech recognition engine linked to the second interface of the wrapper, said at least one speech recognition engine containing at least one recognition grammar corresponding to a speech command;

said at least one software application of said speech recognition engine wrapper configured to communicate with said at least one speech recognition engine upon installation of said at least one speech recognition engine, said at least one software application further configured to alert said client component of said speech recognition engine wrapper of said installation;

said client component of said speech recognition engine wrapper configured to call said server component of said central speech processor, said client component farther configured to provide said server component with said address of said speech recognition engine wrapper;

said server component of said central speech processor configured to receive said address of said speech recognition engine wrapper and store said address in said address memory of said central speech processor, said server component further configured to alert said client component of said central speech processor of said stored address;

said client component of said central speech processor configured to call said server component of said speech recognition engine wrapper based on said address stored in said address memory of said central speech processor, said client component further configured to provide said server component with any changes with said address of said central speech processor;

said server component of said speech recognition engine wrapper configured to receive any changes with said address of said central speech processor and store said address in said address memory of said speech recognition engine wrapper, said server component further configured to alert said client component of said speech recognition engine wrapper of said stored address;

said central speech processor configured to recognize said speech recognition engine based on said call by said client component of said speech recognition engine wrapper; and said central speech processor further configured to transmit work to said speech recognition engine.

15. The distributed speech recognition system according to claim 14, wherein the at least one speech recognition engine is configured to communicate with the speech recognition engine wrapper using remote procedure call.

16. The distributed speech recognition system according to claim 14, wherein the speech recognition engine wrapper is configured to communicate with the central speech processor using remote procedure call.

* * * * *